(12) United States Patent
Scherer et al.

(10) Patent No.: US 10,086,882 B2
(45) Date of Patent: Oct. 2, 2018

(54) VEHICLE SAWHORSE ADJUSTABLE ASSEMBLY

(71) Applicants: Joseph G Scherer, Weyerhaeuser, WI (US); Cindy L Scherer, Weyerhaeuser, WI (US)

(72) Inventors: Joseph G Scherer, Weyerhaeuser, WI (US); Cindy L Scherer, Weyerhaeuser, WI (US)

( * ) Notice: Subject to any disclaimer, the term of this patent is extended or adjusted under 35 U.S.C. 154(b) by 0 days.

(21) Appl. No.: 15/009,786

(22) Filed: Jan. 28, 2016

(65) Prior Publication Data

US 2017/0217504 A1    Aug. 3, 2017

(51) Int. Cl.
| | |
|---|---|
| *B60D 1/00* | (2006.01) |
| *B62D 33/02* | (2006.01) |
| *B60P 3/41* | (2006.01) |
| *A01G 23/00* | (2006.01) |

(52) U.S. Cl.
CPC ............ *B62D 33/0215* (2013.01); *B60P 3/41* (2013.01); *A01G 23/003* (2013.01)

(58) Field of Classification Search
CPC ....... B62D 33/0215; B60P 3/41; B60R 3/007; B60D 1/00
USPC ........................................................ 224/519
See application file for complete search history.

(56) References Cited

U.S. PATENT DOCUMENTS

| | | | |
|---|---|---|---|
| 3,202,332 A | 8/1965 | Walker | |
| 4,630,990 A * | 12/1986 | Whiting | B60R 9/042 224/310 |
| 4,645,410 A | 2/1987 | Royer | |
| 4,781,518 A | 11/1988 | Paavila | |
| 5,224,636 A * | 7/1993 | Bounds | B60R 9/06 224/281 |
| 5,433,357 A * | 7/1995 | Alliff | B60R 9/06 224/410 |
| 5,465,883 A * | 11/1995 | Woodward | B60R 9/06 211/41.14 |
| 5,615,813 A * | 4/1997 | Ouellette | B60P 3/40 224/405 |
| 5,695,103 A * | 12/1997 | Duvernay | B60R 9/10 224/502 |
| 5,775,560 A * | 7/1998 | Zahn | B60R 9/06 224/485 |
| 5,784,941 A * | 7/1998 | Sanborn | B27B 17/005 83/471.2 |
| 5,842,615 A * | 12/1998 | Goodness | B60R 9/06 224/509 |

(Continued)

*Primary Examiner* — Brian D Nash
(74) *Attorney, Agent, or Firm* — Clearstar IP; Michael W. Starkweather

(57) ABSTRACT

This invention relates to a vehicle sawhorse adjustable assembly that comprising of an adjustable wing structure operably adapted to provide a support to a plurality of logs in a longitudinally extended direction on a rear end of a cargo bed extension of a vehicle, a plurality of legs to provide an adjustable height using a plurality of holes in a vertically upward direction to the adjustable wing structure, a removable hitching unit to provide a base support to the adjustable wing structure in an adjustable horizontal direction and a hinge mechanism to connect the hitching unit with the plurality of legs and the adjustable wing structure. Further, the user can mount the assembly as an extension of a cargo-bed of a vehicle and insert structural material into the receptacles of the assembly.

3 Claims, 5 Drawing Sheets

(56) References Cited

U.S. PATENT DOCUMENTS

| | | | | |
|---|---|---|---|---|
| 5,845,831 A * | 12/1998 | Nusbaum | ............... | B60R 9/06 |
| | | | | 224/502 |
| 5,884,826 A * | 3/1999 | Shaver | ............... | B60R 9/06 |
| | | | | 211/195 |
| 5,950,892 A * | 9/1999 | Tsai | ............... | B60R 9/06 |
| | | | | 224/497 |
| 7,097,408 B2 * | 8/2006 | Paxton | ............... | B60P 3/10 |
| | | | | 224/504 |
| 7,331,623 B1 * | 2/2008 | Wall | ............... | B60P 3/10 |
| | | | | 224/405 |
| 7,815,083 B2 * | 10/2010 | Clausen | ............... | B60R 9/06 |
| | | | | 224/497 |
| 8,899,456 B2 * | 12/2014 | Williams | ............... | B60R 9/10 |
| | | | | 224/501 |
| 9,156,410 B2 * | 10/2015 | Wang | ............... | B60R 9/045 |
| 9,254,790 B2 * | 2/2016 | Dreger | ............... | B60R 9/10 |
| 2002/0066839 A1 * | 6/2002 | Pollack | ............... | B60R 9/06 |
| | | | | 248/200 |
| 2005/0035167 A1 * | 2/2005 | Threet | ............... | B60R 9/06 |
| | | | | 224/501 |
| 2010/0320739 A1 * | 12/2010 | Kittrell | ............... | B60D 1/06 |
| | | | | 280/789 |
| 2012/0000952 A1 * | 1/2012 | Dreger | ............... | B60R 9/10 |
| | | | | 224/533 |

* cited by examiner

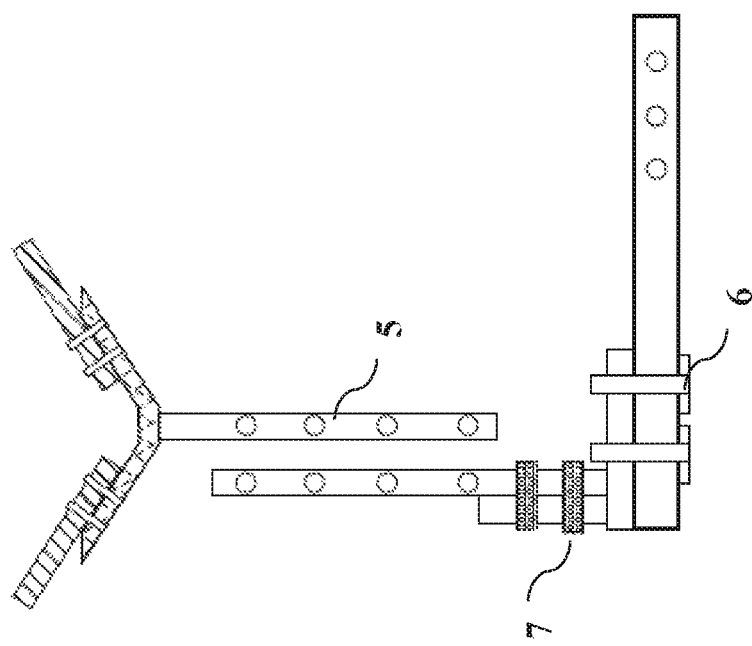

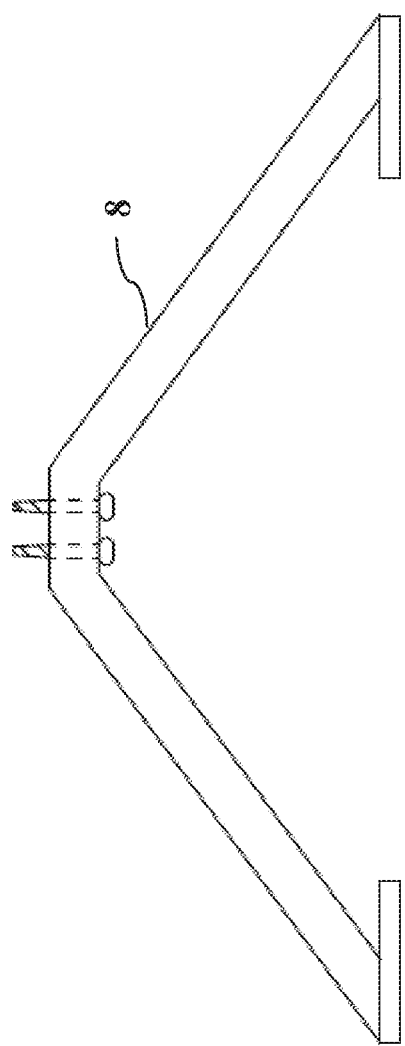

VEHICLE SAWHORSE ADJUSTABLE ASSEMBLY

CROSS REFERENCE TO RELATED APPLICATIONS

Not applicable

FEDERALLY SPONSORED RESEARCH AND DEVELOPMENT

Not applicable.

MICROFICHE

Not applicable

BACKGROUND OF THE INVENTION (1) Field of the Invention

The present invention relates to the field of the object-carrying assembly for external use on the cargo bed extension of the motor vehicles. The invention, particularly relates to a vehicle cargo bed extension having a sawhorse adjustable assembly.

(2) Background of the Invention

The system provides a general way to avoid the difficulties and costs of complicated load-carrying operations. One of the primaries "prior art problems" addressed by this invention is, how to attach (or mount) load or objects on the vehicle structure or frame. Another "primary prior art problem" is how to design and construct on the vehicle structure or frame. The solutions to these two problems directly depend on solving the most difficult "prior art problem" faced by all people who attempt to construct carts, wagons, and other such vehicles, namely how to construct the load-carrying assembly. That problem is solved indirectly, but effectively, by this invention.

Most all prior art vehicle construction involves complicated manufacturing processes and entails the necessary costs of a commercial or industrial manufacturing operation. Consequently, the result is high-cost vehicles, unaffordable and inaccessible for economically-poor people.

U.S. Pat. No. 4,645,410 to Royer discloses a device which is attached to the earth moving blade of a vehicle for use in hauling felled trees and logs. This device is attached to an end of the blade and permanently extends beyond the end of the blade. As a result the device is subject to damage when using the blade in a normal manner unless the device is first dismounted.

U.S. Pat. No. 4,781,518 to Paavila discloses a tree gripping device which is mounted on a bulldozer blade and permanently projects beyond the edge of the blade. Accordingly, this device is also subject to damage when using the bulldozer blade in the normal manner, unless the device is first dismounted.

Another load-carrying device for use with automobiles is known which is mounted to the rear bumper and frame shown in U.S. Pat. No. 3,202,332. While this device also permits access to the vehicle's cargo compartment, it requires permanent mounting bolts to the rear bumper and to the frame of the vehicle.

With the exception of original factory racks, it is generally understood to be desirable that rack installations not cause any permanent alteration, damage, or structural changes to the vehicle. Such alteration or damage would reduce the resale value of the vehicle, as well as the vehicle's aesthetic appeal to the current owner.

Accordingly, the need remains for a wood or cargo carrier attachment for use on an automobile which can be quickly and easily attached to and detached from the vehicle, preferably without the need for tools. The invention presented herein is a unique solution to this problem. The device described herein allows the cargo carrier to be securely suspended on the back of the vehicle. When desired, the cargo carrier can be easily removed from its position form the back, and the trunk can then be easily opened and entered.

SUMMARY OF THE INVENTION

In the view of the foregoing disadvantages inherent in the known types of object carrier assembly for motor vehicles now present in the prior art, the present invention provides an improved vehicle sawhorse adjustable assembly. As such, the general purpose of the present invention, which will be described subsequently in greater detail, is to provide a new and improved vehicle sawhorse adjustable assembly, which has all the advantages of the prior art and none of the disadvantages.

An object of the invention is to provide a vehicle sawhorse adjustable assembly, i.e. having an adjustable wing structure operably adapted to provide a support to a plurality of logs in a longitudinally extended direction on a rear end of a cargo bed extension of a vehicle, a plurality of legs to provide an adjustable height using a plurality of holes in a vertically upward direction to the adjustable wing structure.

It is another object of the present invention to provide a removable hitching unit to provide a base support to the adjustable wing structure in an adjustable horizontal direction and a hinge mechanism to connect the hitching unit with the plurality of legs and the adjustable wing structure.

It is another object of the present invention to provide the vehicle sawhorse adjustable assembly, i.e. mounted on the automobile by a receiver hitch or by adding external supports, like legs, so that it could be set on the ground at a working level for the user.

It is another object of the present invention to provide the vehicle sawhorse adjustable assembly that holds woods or logs at a comfortable working level to cut into firewood and then it could be loaded in the vehicle's compartment or cargo bed.

It is another object of the present invention to provide the vehicle sawhorse adjustable assembly, i.e. easy to manufacture, yet provides a strong, useful and durable product for the consumer.

It is another object of the present invention to provide the vehicle sawhorse adjustable assembly that makes easy the process of fire-wood cutting and helps the people with back-pain issues to cut fire-wood.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

These together with other objects of the invention, along with the various features of novelty which characterize the invention, are pointed out with particularity in the disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 4 is a diagram illustrating the top view of the vehicle sawhorse adjustable assembly.

FIG. 5 is a diagram illustrating the front view of the vehicle sawhorse adjustable assembly, as it would be mounted on the rear side of a cargo-bed of the motor vehicle.

DETAILED DESCRIPTION OF THE INVENTION

In the following detailed description, reference is made to the accompanying drawings which form a part hereof, and in which is shown by way of illustration specific embodiments in which the invention may be practiced. These embodiments are described in sufficient detail to enable those skilled in the art to practice the invention, and it is to be understood that the embodiments may be combined, or that other embodiments may be utilized and that structural and logical changes may be made without departing from the spirit and scope of the present invention. The following detailed description is, therefore, not to be taken in a limiting sense, and the scope of the present invention is defined by the appended claims and their equivalents.

The present invention generally provides a vehicle sawhorse adjustable assembly that comprises: an adjustable wing structure (1), a plurality of legs (2), a plurality of brackets, a plurality of holes, a removable hitching unit, a base support to the adjustable wing structure and a hinge mechanism. Further, the invention is an object carrier assembly that is mounted on the rear side of a cargo bed of a vehicle, thereby rendering a base for object carrying rack.

Figure 1:
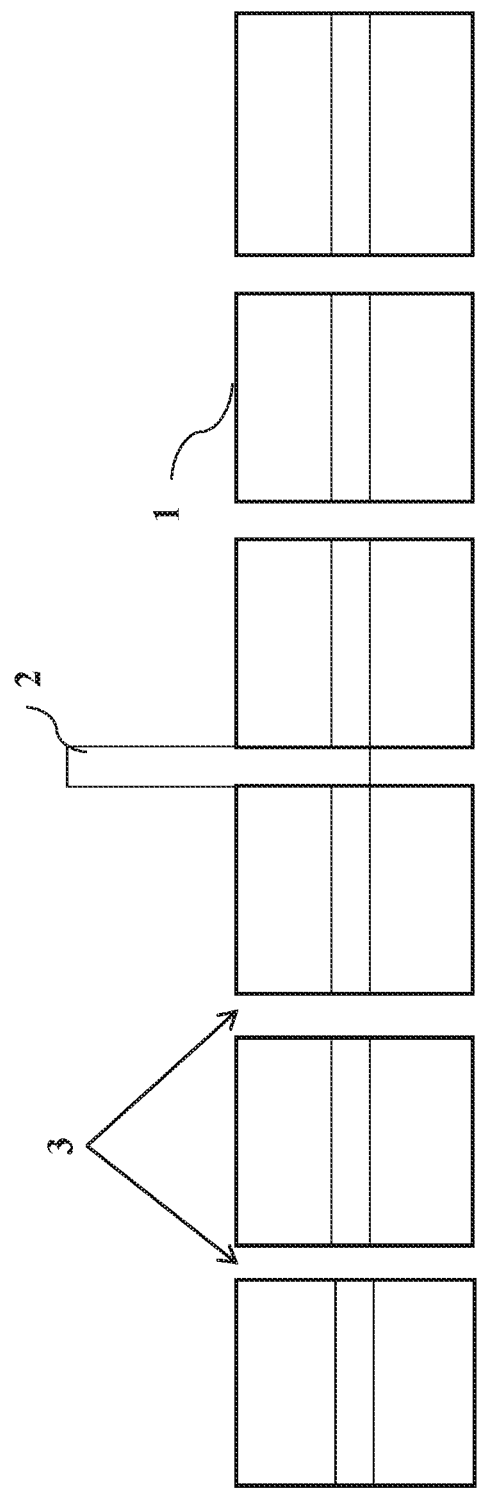
FIG. 1 is a diagram illustrating the front view of the vehicle sawhorse adjustable assembly, i.e. in a flat position for working area.

As shown in FIG. 1, the invention involves utilization of an adjustable wing structure (1) which is operably adapted to provide a support to a plurality of logs in a longitudinally extended direction on a rear end of a cargo bed extension of a vehicle. The structure is, ideally but not necessarily, movable with partly semi wing structure in vertical and horizontal direction and further, the adjustable wing structure is made of a plurality of steps (1).

In accordance with an embodiment of the present invention, the plurality of steps (1) is being placed parallel with a pair of steps on the adjustable wing structure. The plurality of steps is positioned to provide a spacing (3) between the pair of steps for a saw blade. Preferably, the adjustable wing structure is made of material, but not limited to, wood, synthetic hard plastic, tubular iron, a metallic and non-metallic elements, although other suitable material can also be used as per the need of the manufacturer.

Figure 2:
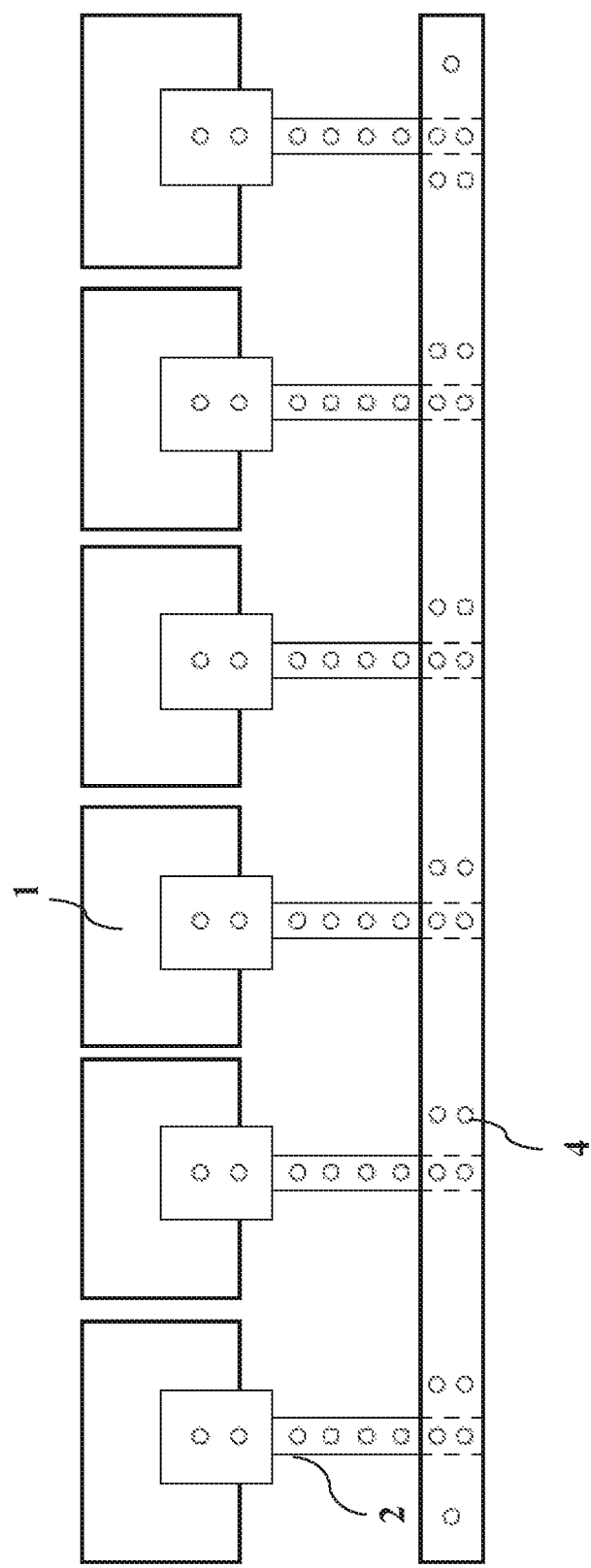
FIG. 2 is a diagram illustrating the side view of the vehicle sawhorse adjustable assembly.

FIG. 2 is the side view of the vehicle sawhorse adjustable assembly in accordance with one of the preferred embodiments of the present invention. The present invention provides a very efficient and simple structure having a plurality of legs (2) to provide an adjustable height using a plurality of holes in a vertically upward direction to the adjustable wing structure. The plurality of holes (4) helps the user in the uplifting of the wing structure.

In accordance with an embodiment of the present invention, the plurality of legs is configured to support by an angle iron, which could be adjusted in height according to the user's need while bolted to angle iron that possesses mounting shaft holes. Further, a plurality of brackets is arranged in a series by mounting on the angle iron.

Figure 3:
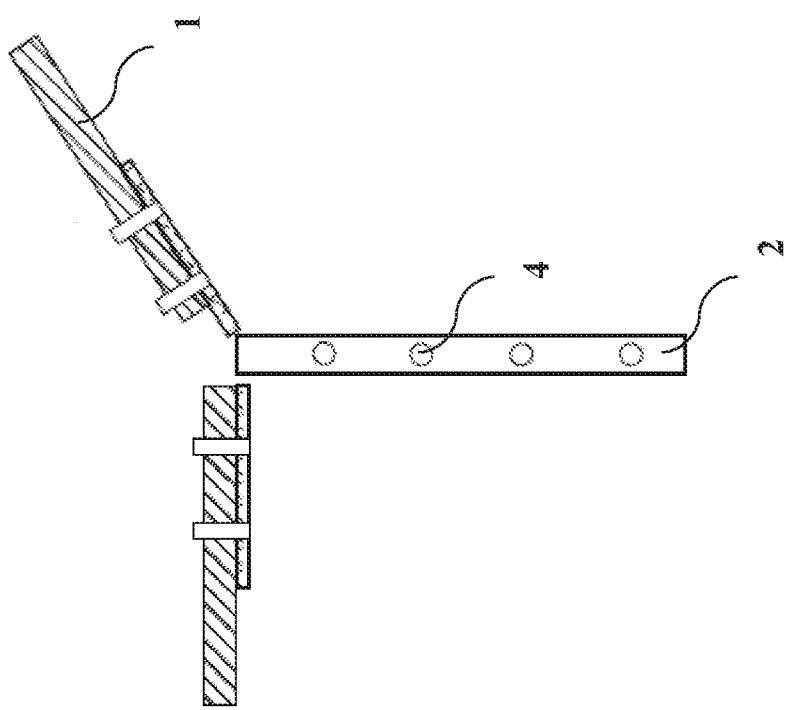
FIG. 3 is a is a diagram illustrating the plain view of the an external leg which could be added to the vehicle sawhorse adjustable assembly for using without a motor vehicle.

In the configurations as illustrated in FIG. 3, a plain view of the external leg (2) from a plurality of legs, which could be added to the vehicle sawhorse adjustable assembly, for using without a motor vehicle in accordance with an embodiment of the present invention. The plurality of legs is having various sizes for which the wing structure to be utilized as sake of ease to the user.

In accordance with an embodiment of the present invention, the plurality of legs is configured to have an upper section pivotally attached on a horizontal pivot axis between the removable hitching unit and the adjustable wing structure (1) for providing movement to a partly semi wing structure in vertical and horizontal direction.

Referring to FIG. 4, i.e. showing the top view of the vehicle sawhorse adjustable assembly a hinge mechanism to connect the removable hitching unit (6) with the plurality of legs and the adjustable wing structure by using a plurality of brackets. The mounting angle iron (5) of a bracket assembly from a plurality of brackets is bolted onto the angle iron or tube, which is attached to the receiver hitch for inserting through the vehicle receiver hitch and screwed by a hitch pin (7).

In accordance with an embodiment of the present invention, the wing structure is mounted on a removable hitching unit, which is detachably connected to the plurality of legs with the adjustable wing structure. The hinge mechanism is configured to connect the hitching unit with the plurality of legs and the adjustable wing structure.

As depicted in FIG. 5, the front view of the vehicle sawhorse adjustable assembly, as it would be mounted on the rear side of a cargo-bed of the motor vehicle. Preferably, the wing structure is operably adapted to provide a support to a plurality of logs in a longitudinally extended direction on a rear end of a cargo bed extension of a vehicle. The plurality of legs is being, but not limited to, tubular (8) in cross section. Some means of attaching the plurality of brackets in a series, is positioned to with the wing structure and approximately near to each other. Further, the means of attachment to a cargo bed extension of a motor vehicle is a flat bar that fits into a hitching unit and is secured with conventional hitch mechanism, such as by extending a hitch pin through the hitching unit and the flat bar.

The above-mentioned vehicle sawhorse adjustable assembly with a removable hitching mechanism provides flexibility to users by controlling the level of the height, therefore safer and easier for wood cutting people with back pain issues. The current invention provides a plurality of brackets, sized to hold conventional structural material, of sufficient length and strength so that any inserted structural material is firmly held, arranged relative to each other substantially like the letter 'V' or a wing structure. The movable wing structure directed to a vehicle sawhorse that a saw back specifically designed and constructed to cut firewood with chainsaws and provides an assembly which is additionally characterized of being inexpensive in manufacturing. Users can easily install it in the underneath to the bottom inner base at the rear side of the cargo bed of the vehicle. It eliminates the use of ordinary saw, conventional sawhorse or the like tool.

It is to be understood that the above description is intended to be illustrative, and not restrictive. For example, the above-discussed embodiments may be used in combination with each other. Many other embodiments will be apparent to those of skill in the art upon reviewing the above description.

The benefits and advantages which may be provided by the present invention have been described above with regard to specific embodiments. These benefits and advantages, and any elements or limitations that may cause them to occur or to become more pronounced are not to be construed as critical, required, or essential features of any or all of the embodiments.

While the present invention has been described with reference to particular embodiments, it should be understood that the embodiments are illustrative and that the scope of the invention is not limited to these embodiments. Many variations, modifications, additions and improvements to the embodiments described above are possible. It is contemplated that these variations, modifications, additions and improvements fall within the scope of the invention.

What is claimed is:

1. A wood working fixture to aid in the holding and cutting of logs and the like that is mountable to a vehicle, comprising:
    a) a vehicle attachment device, having a longitudinal length that extends out from vehicle rear end, designed to couple the vehicle to the wood working fixture;
    b) a base support structure, coupled to the vehicle attachment device, having a longitudinal axis that is oriented perpendicular to the vehicle attachment device, and extending an equal distance on either side of the vehicle attachment device;
    c) a first, second, third and forth leg, coupled to the base support structure, each having a longitudinal axis that is vertical and oriented perpendicular to the base support structure and extends vertically above the base support structure, wherein the first and second legs are positioned on side of the vehicle attachment device, and the third and forth legs are positioned on the base support structure opposite to the first and second legs position; and
    d) a first, second, third, and forth wood holding portion, each coupled to the first, second, third, and forth leg respectively, wherein each wood holding portion having:
        i) a right and left wood holding piece, separated by a vertical plane that is parallel to the longitudinal axis of the base support structure, and positioned a vertical distance above the base support structure;
        ii) wherein there is a first position that orients each of the right and left wood holding pieces approximately 45 degrees on opposite sided from the vertical plane located therebetween; and
        iii) wherein there is a second position that orients at least one of the right and left wood holding pieces approximately 90 degrees from a vertical plane positioned therebetween;
        iv) wherein the right and left wood holding pieces each include a flat plate, oriented to hold a piece of wood in a position that is horizontal and parallel to the base support structure, wherein the plates extend to abut each other and forming a gap between each plate that is located midway between each leg;
    wherein, the first, second, third and forth legs are adjustable in length along the longitudinal axis of the base support structure to form a variable vertical space located between the first and second wood holding portions, which is perpendicular to the vertical plane.

2. The wood working fixture of claim 1, wherein vehicle attachment device is a single shaft that is insertable into a trailer hitch socket.

3. The wood working fixture of claim 2, wherein vehicle attachment device is a structure that is mountable to a bed of a vehicle.

* * * * *